United States Patent [19]

Levine

[11] Patent Number: 5,356,568
[45] Date of Patent: Oct. 18, 1994

[54] INTUMESCENT HEAT- AND FIRE-RESISTANT COMPOSITION AND SUBSTRATE COATED THEREWITH

[76] Inventor: Harvey S. Levine, 6901 Harrowdale Rd., Apt. 102, Baltimore, Md. 21209

[21] Appl. No.: 604,230

[22] Filed: Oct. 29, 1990

[51] Int. Cl.$^5$ ............................................. C09D 5/18
[52] U.S. Cl. .................................. 252/606; 523/179; 524/100; 106/18.14
[58] Field of Search ........................ 252/606; 523/179; 106/18.14, 18.2, 18.31; 524/100, 142

[56] References Cited

U.S. PATENT DOCUMENTS

| | | | |
|---|---|---|---|
| 2,984,640 | 5/1961 | Kaplan | 524/100 OR |
| 3,284,216 | 11/1968 | Kaplan | 252/606 X |
| 3,513,114 | 5/1970 | Hahn et al. | 523/179 OR |
| 3,562,197 | 2/1971 | Sears et al. | 252/606 X |
| 3,654,190 | 4/1972 | Levine | 252/606 OR |
| 3,912,671 | 10/1975 | Kondo et al. | 524/377 X |
| 3,914,193 | 10/1975 | Fessler et al. | 523/179 OR |
| 3,915,777 | 10/1975 | Kaplan | 106/18.23 X |
| 3,969,291 | 7/1976 | Fukuba et al. | 523/179 OR |
| 4,009,137 | 2/1977 | Dany et al. | 523/179 OR |
| 4,104,073 | 8/1978 | Koide et al. | 106/18.14 X |
| 4,166,743 | 9/1979 | Wortmann et al. | 106/18.14 X |
| 4,247,435 | 1/1981 | Kasten | 106/18.16 X |
| 5,225,464 | 7/1993 | Hill, Jr. | 252/606 X |

OTHER PUBLICATIONS

Iler, Ralph K., *The Chemistry of Silica*, (John Wiley & Sons, Inc., N.Y. 1979) pp. 430–432.

Primary Examiner—Robert L. Stoll
Assistant Examiner—Daniel S. Metzmaier
Attorney, Agent, or Firm—Kerham, Stowell, Kondracki & Clarke

[57] ABSTRACT

An intumescent, fire retardant coating composition comprising an organic binder, an inorganic binder, a blowing agent, a carbonific, a phosphorous containing material, a halogen containing material, an inorganic filler, and an organic solvent. The invention also relates to a substrate coated with the composition and a method of applying the coating on a substrate.

7 Claims, 3 Drawing Sheets

INTUMESCENT HEAT- AND FIRE-RESISTANT COMPOSITION AND SUBSTRATE COATED THEREWITH

BACKGROUND OF THE INVENTION

1. Field of the Invention

The invention relates to a heat-resistant and fire-retardant coating composition which, upon application to a substrate and exposure to heat, decomposes and reacts to form a highly heat-resistant, thermal insulating and non-flammable barrier layer.

2. Description of the Prior Art

Intumescent, fire-retardant coating compositions containing carbonifics, film-forming binders and phosphorous materials are well known in the art. U.S. Pat. Nos. 3,562,197; 3,513,114; 4,009,137; 4,166,743 and 4,247,435 disclose such compositions containing ammonium polyphosphates as the phosphorous containing material. U.S. Pat. No. 3,969,291 describes the use of an amide polyphosphate condensate as a fire-retardant additive in an intumescent coating composition. U.S. Pat. No. 3,914,193 discloses the similar use of a crystalline form of melamine pyrophosphate.

U.S. Pat. No. 3,654,190 discloses an intumescent paint comprising a resinous binder, a blowing agent, a phosphorous containing material, a source of chlorine a solvent, an anti-settling agent, a pigment and a surfactant.

All of the prior art intumescent paint/coating compositions suffer from a variety of disadvantages. For example, the prior art compositions are relatively slow drying paints/coatings such that a relatively long drying period is required before any article onto which the paint/ coating was applied could be handled. These prior art paints/ coatings are also relatively soft and/or brittle and therefore prone to chip when subjected to rough handling. The prior paints/coatings are also water permeable and therefore prone to degrade when exposed to moist environments such as the sea. The prior art paints/coatings also suffer from the fact that it is difficult to form a strong adherent bond between the coatings and the substrate to which they are applied. Furthermore, the char formed by prior paints/ coatings were weak and were easily blown away if the fire had a velocity component, if there was a wind or by the velocity of the water from a fire hose.

Moreover, although prior art formulations provided a relatively high degree of fire- and flame-retardance to substrates to which they were applied, most intumescent fire protective paints/coatings did not weather well and have been relegated to mostly interior applications. These protective coatings/paints did not provide long duration protection against severe fires as high as 70,000 BTU/ft$^2$·hr. The paints/coatings did not perform in high velocity fires where the velocity of the burning combustion front was 59-73 ft/sec. The prior art paints/coatings were not required to provide long term protection against intense, high velocity fires. The prior art paints/coatings were also water permeable, suffered degradation when exposed to moist environments, and would not provide resistance to harsh operational conditions such as multiple impacts.

It is an object of the present invention to provide an intumescent coating composition which is not subject to the above-noted disadvantages.

It is a further object of the present invention to provide a substrate coated with an improved fire-retardant and heat-resistant coating.

It is a still further object of the invention to provide a method of coating a substrate with a composition which provides a high degree of flame-retardance and heat-resistance.

SUMMARY OF THE INVENTION

The above and other objects of the invention are provided by the present invention, one embodiment of which is an intumescent heat-resistant and fire-retardant coating composition comprising:

(a) an organic binder comprising a mixture of an organic film-forming polymeric material and a halogen containing rubber material;

(b) an inorganic binder comprising a mixture of an air-setting cementitious material and silica;

(c) a heat-activated organic blowing agent;

(d) a carbonific;

(e) a phosphorous containing material which, under the action of heat, reacts with one or more of the remaining ingredients in the composition to form water and phosphorous;

(f) a halogen containing material which, under the action of heat, produces a fire-extinguishing halogen gas;

(g) inorganic materials resistant to heat; comprising a mixture of inorganic fibers and inorganic particles and;

(h) an organic solvent for the organic components of the composition.

Optionally, the composition additionally contains:

(i) an anti-settling agent

Another embodiment of the invention comprises a substrate coated with the above-described composition.

Still another embodiment of the invention comprises a method of imparting a high degree of flame-retardance, thermal insulation and heat-resistance to a substrate by applying the above-described composition thereto and allowing it to dry.

DETAILED DESCRIPTION OF THE INVENTION

Figure 1:
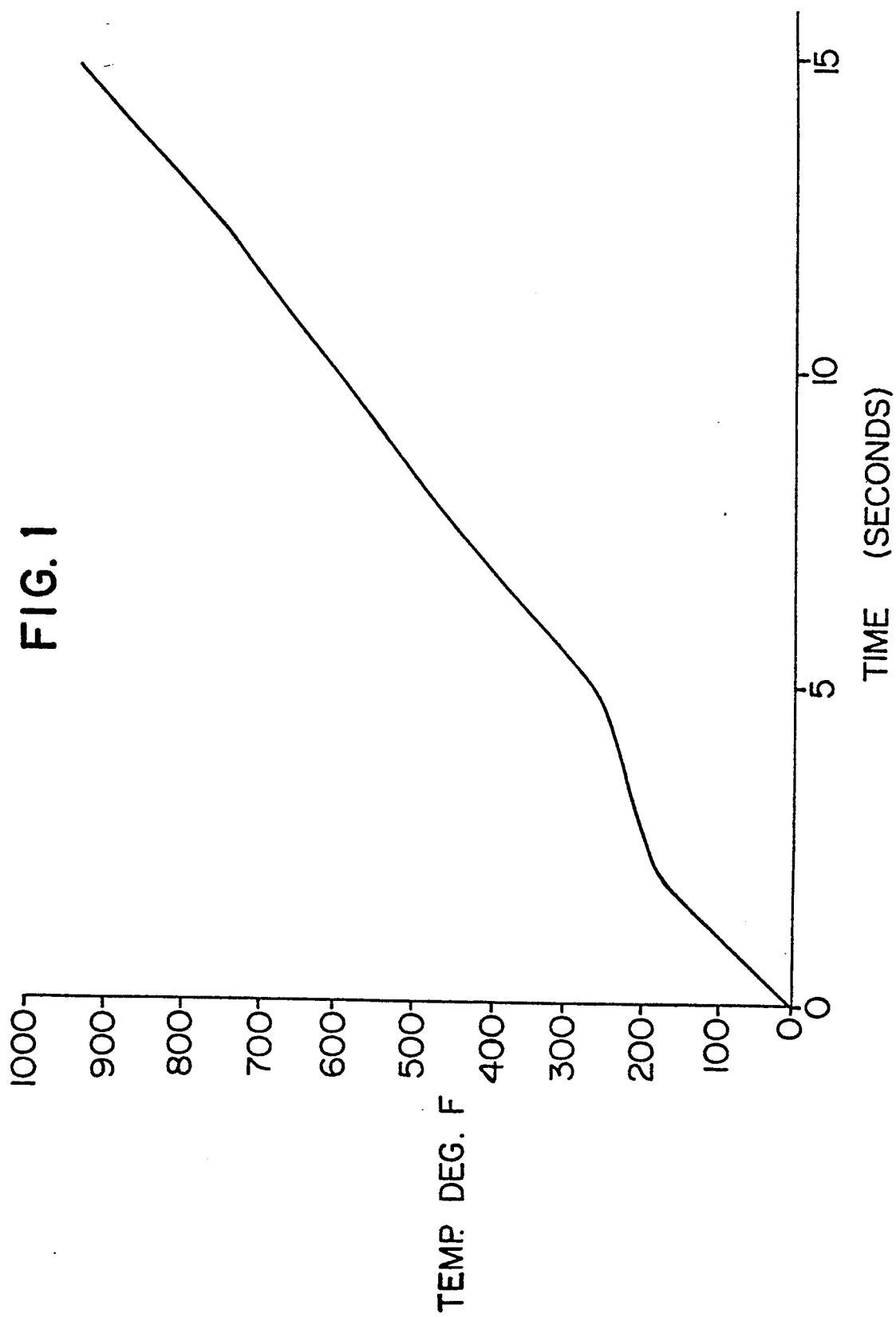
FIG. 1 is a graphic illustration of the time required for the uncoated plate to reach a temperature of 800° F. and above.

Each of the components of the composition of the invention combine to produce a formulation which overcomes the above-noted disadvantages associated with prior art coating compositions. The coating is a solvent based, thermally activated, intumescent, ablative coating. The coating is a durable coating which exhibits resistance to high intensity multiple impacts. It is tough yet has flexible components over a wide range of operational temperatures. It is water-resistant, and resistant to a multitude of chemicals. When exposed to flame, the dried coating volatilizes, exhibiting a volume increase through the formation of an open, multicellular matrix; absorbing and blocking heat to protect the underlying substrate material. The coating protects a steel substrate from reaching temperatures of 800° F. when exposed to heat fluxes of approximately 70,000 BTU/ft$^2$·hr and high velocities and has an effectiveness on the order of 4700% over the unprotected steel (i.e., 12.5 sec. for the unprotected substrate to 783 sec. for the protected substrate). The high performance characteristics of the composition enable its use as an exterior coating for substrates exposed to the elements.

In a preferred embodiment, the composition, by weight, of the coating formulation is as follows:

| | | |
|---|---|---|
| (a) | organic binder | 9.0–14.0% |
| (b) | inorganic binder | 7.0–14.6% |
| (c) | blowing agent | 6.0–12.0% |
| (d) | carbonific | 5.0–12.0% |
| (e) | phosphorous containing material | 17.0–35.0% |
| (f) | halogen containing material | 2.0–10.0% |
| (g) | inorganic material | 3.9–10.3% |
| (h) | solvent | >25% |
| (i) | anti-settling agent | 0.3–0.7%. |

Each of the components of the composition of the present invention contributes a specific property to the formulation and each is critical to the success of the invention in overcoming the disadvantages associated with the prior art formulations.

The organic and inorganic binder components function to impart structural integrity to the applied coating after application and drying.

The organic binder (film former and halogenated rubber) also aid in imparting flexibility to the finished coating as well as functioning as a carbonific, i.e., char former and source of fire extinguishing gases when decomposed by heat.

The inorganic binder (air-setting cementitious material and silica) helps to lock in the more permeable components of the formulation upon drying and setting. This component also adds in establishing a heat insulating barrier to protect the underlying coated substrate. The inorganic binders also impart rigidity and impact-resistant strength to the finished coating.

The blowing agent is one that releases a gas on heating which functions to expand the coating into an open celled matrix that acts as an insulating shield against heat. The blowing agent is selected so as to be reactive with the carbonific and phosphorous containing material to form water and phosphorous which function as fire extinguishers in the coating layer between the fire and the coated substrates.

Thus, where the blowing agent is melamine, the carbonific is pentaerythritol and the phosphorous containing material is an ammonium phosphate. Heat decomposition of the melamine produces ammonia, urea, water, carbon dioxide, etc. The gases act to expand the volume of the coating. Under the influence of the heat from the fire the catalyst decomposes, yielding phosphoric acid. The reactive phosphoric acid produced by the breakdown of the catalyst reacts with the alcohol to produce water. In addition, the organic components are degraded by heat to produce an insulating char layer. It will be understood by those skilled in the art that the foregoing is a theory and that it is not intended that the invention be bound thereby.

The halogen containing material Serves several functions. It acts as a plasticizer and flexibilizer for the dried coating. On exposure to heat it is reduced to a char and liberates a halogen gas which aids in the extinguishing of flames.

The inorganic material is also multifunctional. In the finished coating the fibers and particulate material enhance the overall strength and impact resistance. On exposure to heat they serve to reinforce the char layer thereby preventing its dislodgement. At extremely high temperatures it melts to form a frit, which; is highly insulative and heat resistant.

The organic solvents function, of course, as solubilizers for the organic components of the formulation and as a dispersant for the inorganic components during storage and the actual coating operation.

Optimally, a small amount of water (1 to 3% by weight, based on the weight of the final composition) may also be added to accelerate curing of the inorganic binder component.

The anti-settling agent functions to prevent settling out or agglomeration of the components dispersed in the coating formulation. Its presence is not critical if the formulation is prepared immediately prior to the coating operation. It also serves to enhance the coating operation.

Preferably, the organic binder is a mixture of a polymer, e.g., a vinyl polymer or copolymer and a chlorinated rubber. The vinyl polymer or copolymer is preferably a vinyl toluene/butadiene copolymer (e.g., Pliolite VT, Goodyear), vinyl toluene/acrylic copolymer, vinyl toluene/thermoplastic alkyd, styrene/butadiene copolymer, styrene/acrylate copolymer, vinyl chloride polymer, vinylidene chloride polymer or polyvinyl acetate.

The chlorinated rubber is preferably chlorinated natural rubber and preferably contains at least about 67%, by weight, of chlorine.

In a preferred coating composition, the organic binder comprises a mixture of vinyl toluene/butadiene copolymer and chlorinated natural rubber.

Preferably, the weight ratio of the vinyl polymer or copolymer to chlorinated rubber is from about 3:2 to about 8.3:1.7.

The weight ratio of air-setting cementitious material to silica is from about 4.5:5.5 to about 7:3.

In a preferred coating composition, the inorganic binder comprises a mixture of calcium aluminate cement and finely divided silica.

In a preferred embodiment of the coating composition the blowing agent is melamine, the carbonific is dipentaerythritol or tripentaerythritol and the phosphorous containing material is ammonium polyphosphate, tris (2,3-dibromopropyl) phosphate, tris (beta-chloroethyl) phosphate, guanidine phosphate, urea phosphate, reelamine phosphate, monoammonium phosphate, diammonium phosphate or mixtures thereof.

The halogen containing material is preferably a chlorinated paraffin, most preferably, a mixture of a chlorinated paraffin containing about 70%, by weight, of chlorine and a chlorinated paraffin containing about by weight, of chlorine The weight ratio of 70% chlorinated paraffin chlorinated paraffin is preferably from about 1:1 to about 7.5:2.5.

The heat resistant inorganic material may comprise a mixture of any suitable heat resistant fibers, e.g., mineral fibers, calcium silicate fibers, ceramic fibers and a particulate inorganic, heat and flame resistant material, e.g., glass beads, etc.

The inorganic fibers preferably comprise a mixture of short inorganic fibers having a length of from about 1 micron to about 15 microns and long inorganic fibers having a length of from about 35 microns to about 101,600 microns.

The short inorganic fibers are preferably composed substantially of calcium silicate and the long inorganic fibers preferably substantially comprise mineral fibers.

The weight ratio of short inorganic fibers to said long inorganic fibers is preferably about 2.5:7.5 to 1:1. The weight ratio of inorganic fibers to glass beads is preferably from about 1:1 to about 7.0:3.0.

It will be understood by those skilled in the art, having been exposed to the principles of the invention, that the particular solvent employed is not overly critical. Generally, any relatively volatile organic solvent which solubilizes the organic components of the composition may be utilized. Preferably, toluene, xylene, unsaturated hydrocarbons, VMP naphtha, mineral spirits, isobutyl butyrate, isobutyl alcohol or mixtures thereof may be utilized.

The preferred solvent is a mixture of toluene and xylene wherein the weight ratio of toluene to xylene is about 1:1.

Any suitable anti-settling agent, such as montmorillonite or any other clay may be used in the coating composition.

In a preferred coating formulation, the proportions of ingredients are as follows:

| Ingredient | Wt. % Range |
| --- | --- |
| 1. Vinyl Toluene/butadiene copolymer resin (Pliolite VT) | 5.50–6.00 |
| 2. Chlorinated rubber resin (Parlon, Hercules) | 3.70–3.90 |
| 3. Silica Flour [passes No. 100 mesh] | 5.67–5.80 |
| 4. Calcium aluminate cement | 8.12–8.50 |
| 5. Dipentaerythritol or tripentaerythritol | 6.50–7.00 |
| 6. Phosphate | 17.40–18.00 |
| 7. Melamine | 9.12–10.12 |
| 8. Tris(beta-chloroethyl)phosphate | 1.85–2.00 |
| 9. Chlorinated paraffin 70% (Chlorowax 70, Diamond alkali) | 5.25–5.75 |
| 10. Chlorinated paraffin 40% (Chlorowax 40, Diamond alkali) | 2.75–3.00 |
| 11. Short inorganic fiber-CaSiO$_3$ | 1.98–2.05 |
| 12. Mineral fiber-long fiber | 1.98–2.05 |
| 13. Glass beads-Zeospheres | 2.04–2.06 |
| 14. Toluene | 14.37–16.00 |
| 15. Xylene | 13.37–16.00 |
| 16. Bentone SD1 (National Lead Co.) | 0.40–0.50 |

EXAMPLE 1

A coating composition was prepared from the following list of ingredients:

| Ingredient | Wt. % | Lbs. |
| --- | --- | --- |
| Vinyl toluene/butadiene copolymer resin (Pliolite VT) | 5.50 | .34 |
| Chlorinated rubber resin (Parlon) | 3.70 | .23 |
| Calcium aluminate cement | 8.12 | .50 |
| Silica flour (100 mesh) | 5.67 | .35 |
| Melamine | 9.12 | .57 |
| Dipentaerythritol | 6.50 | .40 |
| TRIS(beta chloroethyl) phosphate | 7.35 | .46 |
| Chlorinated paraffin 70% Cl (Chlorowax 70) | 1.25 | .08 |
| Chlorinated paraffin 40% Cl (Chlorowax 40) | 1.25 | .08 |
| Montmotillonite (Bentone SD1) | 0.40 | .02 |
| Short inorganic fibers-CaSiO$_3$ | 1.98 | .12 |
| Ceramic fibers-long (mineral fiber) | 1.98 | .12 |

-continued

| Ingredient | Wt. % | Lbs. |
| --- | --- | --- |
| Glass Beads-Zeospheres | 2.04 | .13 |
| Melamine phosphate | 17.40 | 1.08 |
| Toluene | 14.37 | .89 |
| Xylene | 13.37 | .83 |

The ingredients were mixed with a high speed drill motor and metal shaft mounted into a collar attached to a rounded mixing head. The resin binders were added to a container with solvent and stirred. The resin binders were then diluted with the rest of the solvents and agitated until uniform. After dilution the chlorinate paraffins were added. No further additions were made until the material was dissolved. The remaining solids were then added (i.e., the dipentaerythritol, melamine, melamine phosphate, fibers, glass beads, the anti-settling agent, the liquid TRIS(beta-chloroethyl) phosphate. The mixture was stirred for ½ hour until dispersed. The container was sized so that the paint filled one-half of the total volume thereof. The container was then placed on a Red Devil paint shaker for forty-five minutes.

The sample was applied to steel panels 0.020 in. thick and aluminum panels 0.025 in. The materials were applied with a gravity flow gun utilizing an opening of 0.04 to 0.05 in. After application, the panels were allowed to dry at room temperature and 50% relative humidity. Normally, the panels were dry to the touch in 2–3 hours. In some cases the panels were allowed to dry for 30 days. After curing, the thickness of the coating was measured using a micrometer.

Figure 2:
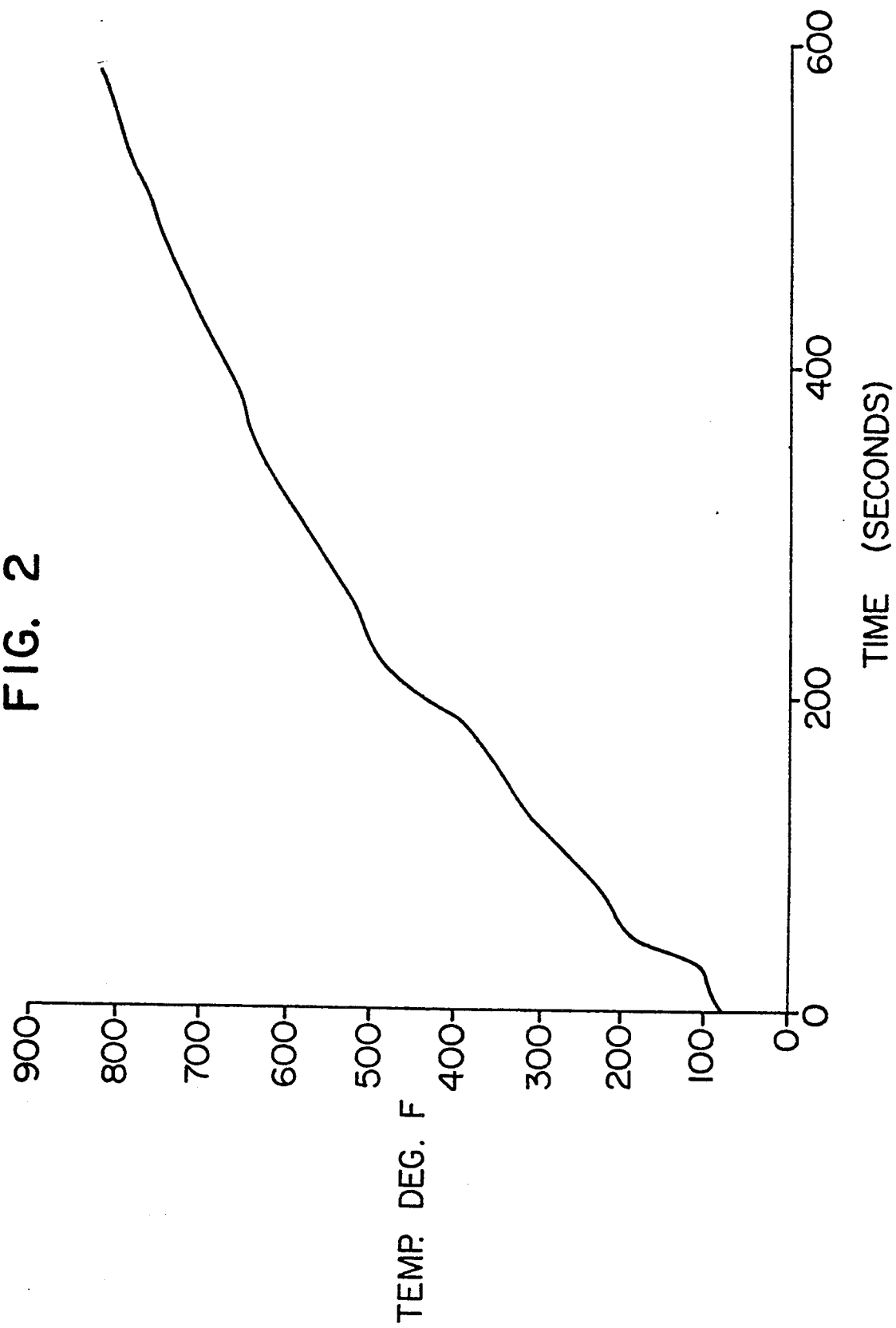
FIG. 2 is a graphic illustration of the time required for the plate containing a 1/16 in. coating to reach a temperature of 800° F. and above.
Figure 3:
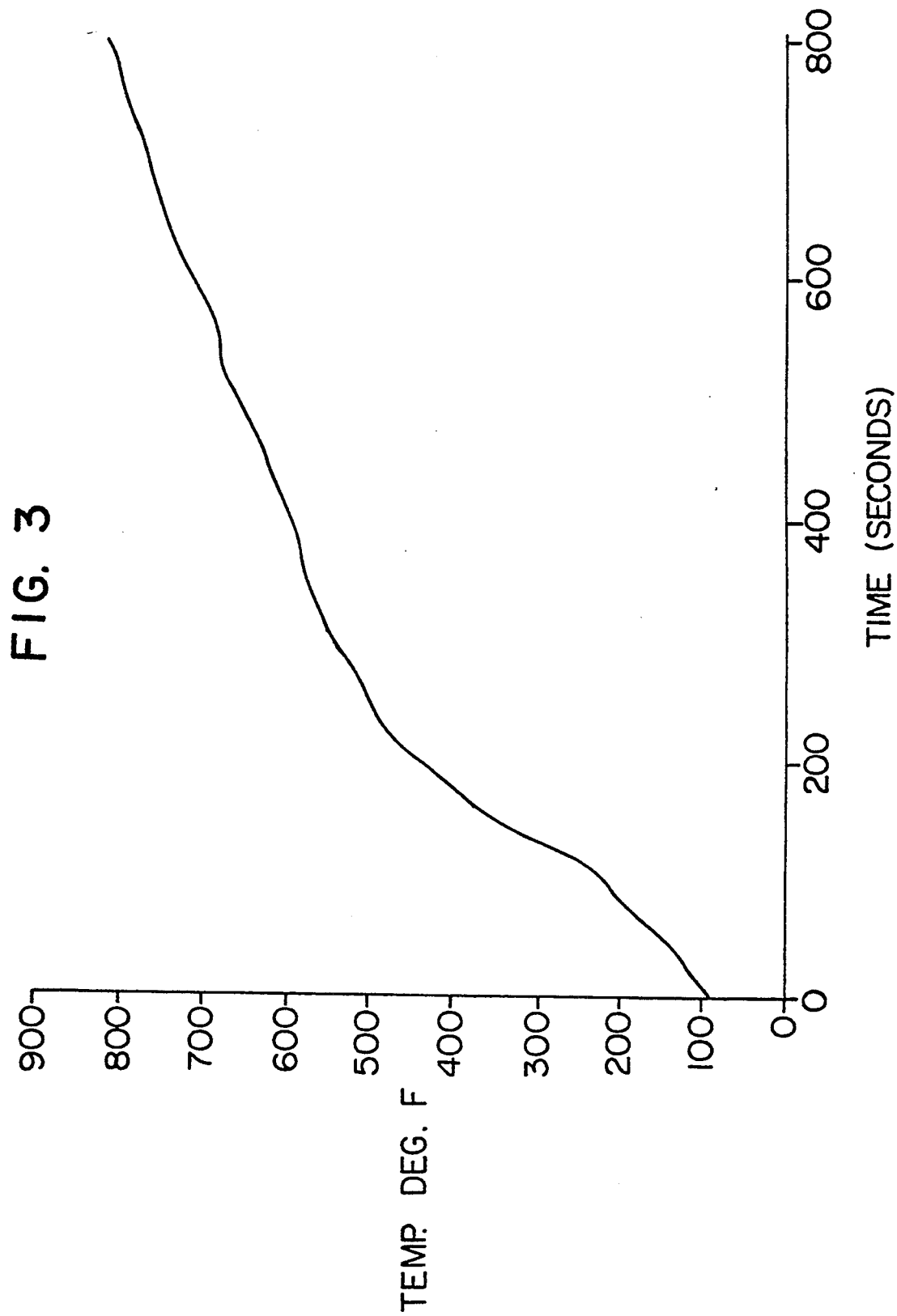
FIG. 3 is a graphic illustrating of the time required for the plate containing a 1/8 in. coating to reach a temperature of 800° F. and above.

Steel plates (0.20 in. thick) coated with approximately ⅛ in. and approximately 1/16 in. coatings by the procedure of Example 1 were subjected to flame tests as follows: The plates were mounted in turn in front of a high velocity torch (torch #2 at approximately 2200° to 2400° F.) such that the bare metal of the uncoated plate and the coatings of the coated plates were exposed to the flame, The temperature of the metal substrate was monitored as a function of time and the time required to reach 800° F. measured in each case. The results are set forth in FIGS. 1–3.

The results indicate the high degree of heat resistance and thermal insulation provided by the coating of the present invention.

The coatings exposed to the torch flames did not burn with a flame but rather, formed a rigid char layer which was very difficult to remove.

It is claimed:

1. An intumescent heat-resistant and fire-resistant coating composition comprising, by weight:
  (a) 9.0 – 14.0% of an organic binder comprising a mixture of an organic film-forming polymeric material selected from the group consisting of a vinyl toluene/butadiene copolymer, a vinyl toluene/acrylic copolymer, a vinyl toluene/thermoplastic alkyl, a styrene/butadiene copolymer, a styrene/acrylate copolymer, a vinyl chloride polymer, a vinylidene chloride polymer and a vinyl acetate polymer; and a chlorinated rubber containing at least about 67% by weight of chlorine;
  (b) 7.0 – 14.6% of an inorganic binder comprising a mixture of an air-setting cementitious material comprising a calcium aluminate cement and silica;
  (c) 6.0 – 12.0% of a heat-activated organic blowing agent comprising melamine;

(d) 5.0 – 12.0% of a carbonific comprising dipentaerythritol or tripentaerythritol;

(e) 17.0 – 35.0% of a phosphorous containing material which, under the action of heat, reacts with one or more of the remaining ingredients in the composition to form water and phosphorous and which is selected from the group consisting of ammonium polyphosphate, tris(2,3-dibromopropyl) phosphate, tris(beta-chloroethyl) phosphate, quanidine phosphate, urea phosphate, melamine phosphate, monoammonium phosphate, diammonium phosphate and mixtures thereof;

(f) 2.0 – 10.0% of a halogen containing material comprising a chlorinated paraffin which, under the action of heat, produces a fire-extinguishing halogen gas;

(g) 3.9 – 10.3% of inorganic materials resistant to heat comprising a mixture of inorganic fibers and inorganic particles; and (h) > 25% of an organic solvent for said organic components of the composition.

2. The composition of claim 1 which additionally contains, by weight:

(i) 0.3 – 0.7% of an anti-settling agent.

3. The composition of claim 1 wherein said chlorinated rubber is chlorinated natural rubber.

4. The composition of claim 1 wherein said organic binder comprises a mixture of vinyl toluene/butadiene copolymer and chlorinated natural rubber.

5. The composition of claim 1 wherein said (g) heat resistant inorganic fibers are mineral fibers, calcium silicate fibers or ceramic fibers.

6. The composition of claim 1 wherein said (h) solvent is toluene, xylene, unsaturated hydrocarbons, VMP naphtha, mineral spirits, isobutyl butyrate, isobutyl alcohol or a mixture thereof.

7. The composition of claim 1 which additionally contains, by weight:

(j) 1 – 3% of water.

* * * * *